May 31, 1960 C. E. BLEIL 2,939,026

COLOR TELEVISION PICK-UP TUBE

Filed Dec. 23, 1957 4 Sheets-Sheet 1

INVENTOR.
Carl E. Bleil
BY
R. E. Fowler
ATTORNEY

COLOR TELEVISION PICK-UP TUBE

Filed Dec. 23, 1957 4 Sheets-Sheet 2

INVENTOR.
Carl E. Bleil
BY
R. E. Fowler
ATTORNEY

May 31, 1960 C. E. BLEIL 2,939,026

COLOR TELEVISION PICK-UP TUBE

Filed Dec. 23, 1957 4 Sheets-Sheet 3

INVENTOR.
Carl E. Bleil
BY
R. E. Fowler
ATTORNEY

May 31, 1960 C. E. BLEIL 2,939,026

COLOR TELEVISION PICK-UP TUBE

Filed Dec. 23, 1957 4 Sheets-Sheet 4

INVENTOR.
Carl E. Bleil
BY
R. E. Fowler
ATTORNEY 2,939,026

COLOR TELEVISION PICK-UP TUBE

Carl E. Bleil, Clawson, Mich., assignor to General Motors Corporation, Detroit, Mich., a corporation of Delaware Filed Dec. 23, 1957, Ser. No. 704,815

11 Claims. (Cl. 313—65)

This invention relates to a television pickup means and more particularly to polychromatic pickup means for detecting and transducing into electrical impulses a plurality of colors to be ultimately used for color television transmission and reception.

The previous apparatus has employed multiple pickups using dichoric mirrors for the color separation. This system entailed a minimum of three cameras with necessary optical trains to delineate the primary colors. Of necessity, this meant bulky and expensive equipment and duplication of the essential parts. Furthermore, it means that it could not be readily applied to picking up an optical image from a microscope.

It is an object in making this invention to provide a unitary, single primary pickup tube to which the polychromatic picture is introduced and which in turn provides a time dispersion of signals which represents the image in the colors desired.

It is a further object in making this invention to provide a unitary pickup tube in which a plurality of different trains of signals are produced representing differend colors, a time dispersion of electrical impulses representing each of the several colors of interest.

It is a still further object in making this invention to provide a color television pickup tube which produces from a color picture obtained on a photoelectric surface, a plurality of trains of electrical signals each representative of a different color of picture in synchronized sequence.

It is a still further object in making this invention to provide a color television pickup tube in which a scene is produced on a photoelectric surface from which ions are dispersed which are chromatically selected by velocity separation.

It is a still further object in making this invention to provide a color television pickup tube in which a color scene is scanned by electronic scanning means.

With these and other objects in view which will become apparent as the specification proceeds, this invention will be best understood by reference to the following specification and claims and the illustrations in the accompanying drawings, in which:

Figure 3:
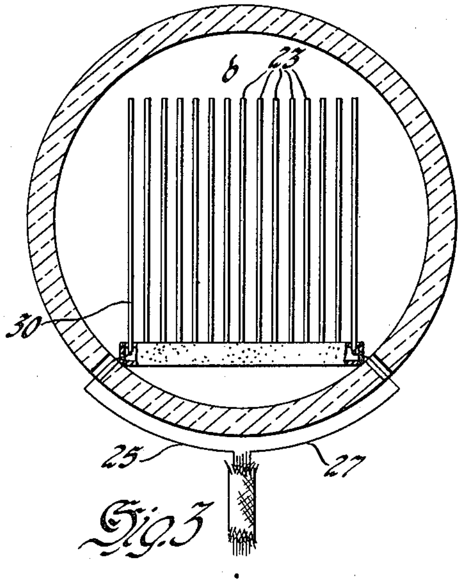
Figure 3 is a sectional view taken on line 3—3 of Figure 1 showing the other portion of the electronic scanning system.
Figures 3A, 3B:
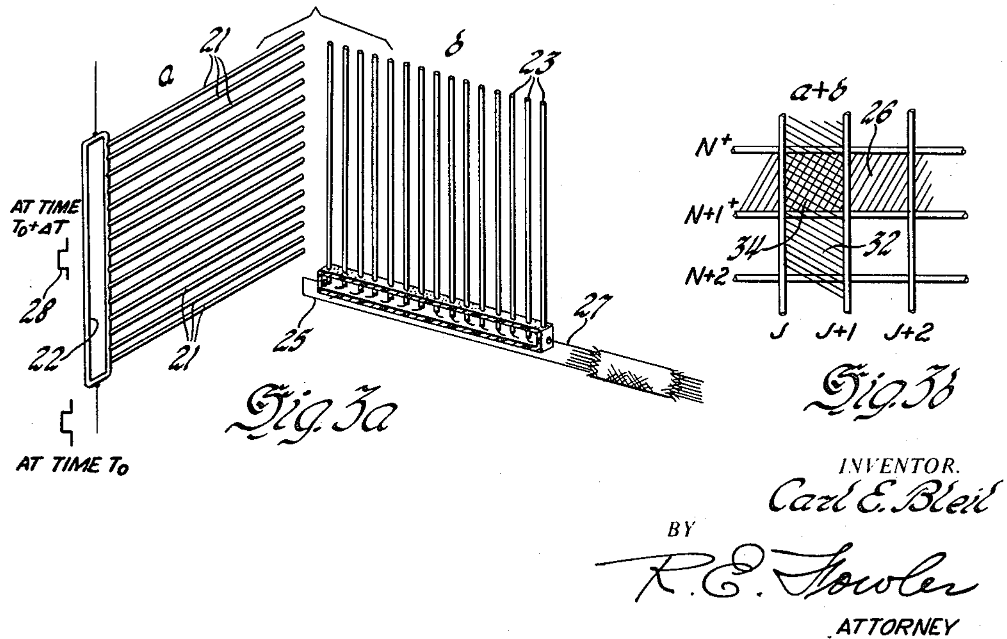

Figure 3*a* is a schematic showing of the tapped delay line together with its associated control pulse to illustrate the energization of the scanning grid.

Figure 3*b* is an enlarged sketch of adjacent lines in the grid to indicate a movable transmission aperture.

Figure 4:
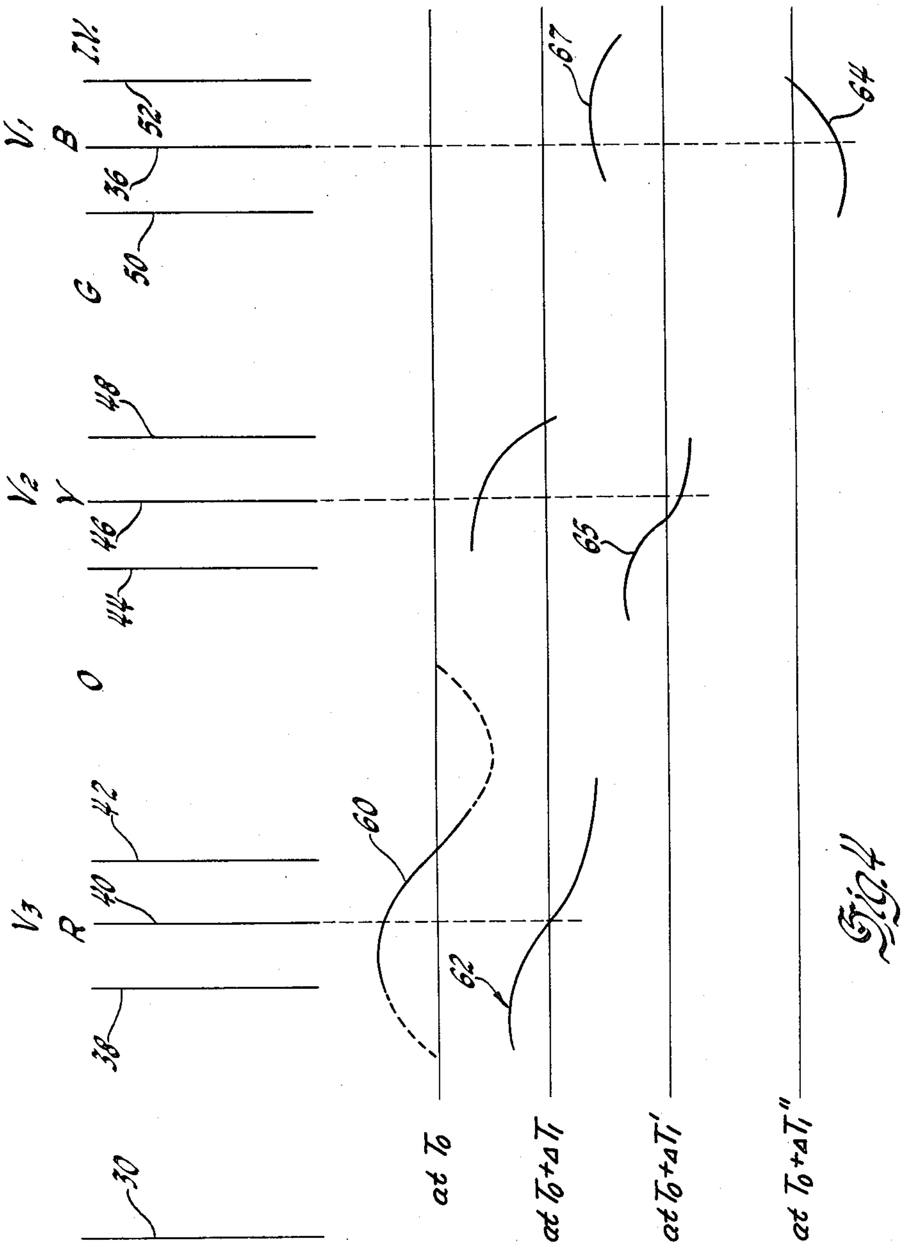
Figure 5:
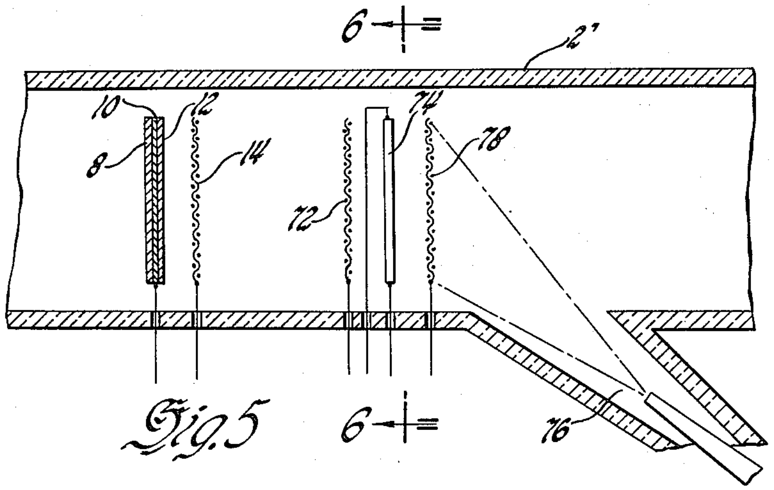

Figure 4 is a diagrammatic showing of the potentials existing on the velocity selecting grids at particular instants to illustrate the selecting principle; and Figure 5 is a vertical sectional view through a television pickup tube showing a modified form of my invention.

Figure 6:
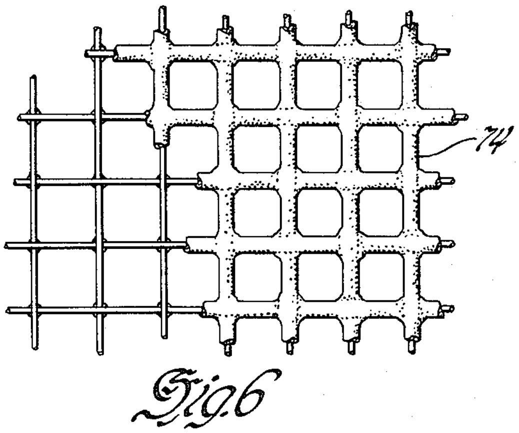

Figure 6 is an enlarged view of a portion of the screen for light scanning shown in Figure 5.

Figure 1:
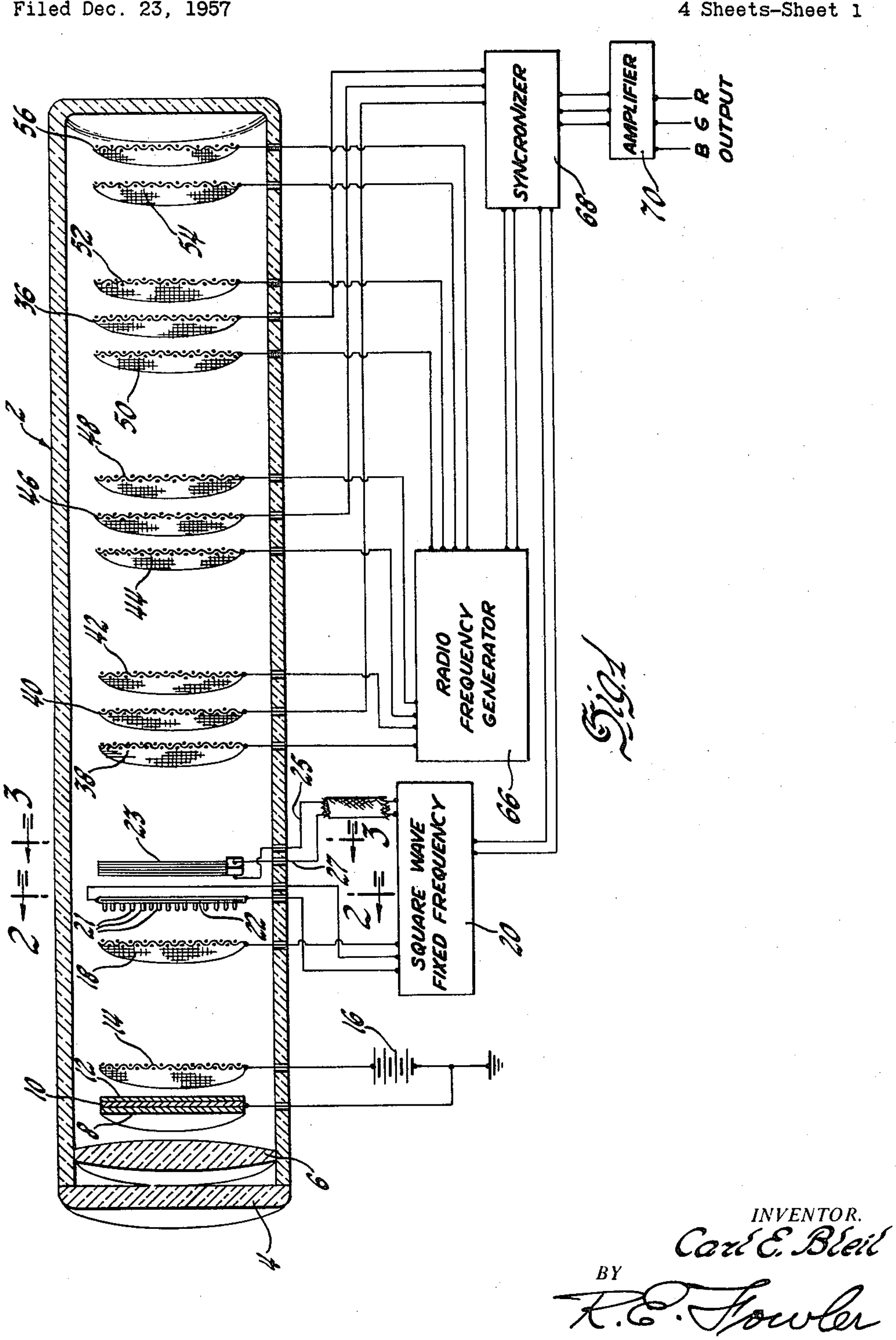
Figure 1 is a combination schematic and block diagram showing the essential features of a pickup tube embodying my invention.

Referring more specifically to Figure 1, there is shown therein a pickup tube 2 which is of elongated form and may be made of glass and is a sealed and evacuated tube. In one end of the tube there is a transparent window 4 through which the image or colored scene may be focused upon a photoelectric surface. Shown mounted within the left-hand end of the tube is the last of a series of lenses 6 for properly and clearly focusing said scene. It is not required that lens 6 appear within the tube.

Next in order in the tube is the photoelectric sensitive surface which is formed of a lamina of different surfaces, the first taking the form of a supporting transparent sheet 8 which may be of glass, one surface of which is coated with a conductive layer 10 such for example, as aluminum or silver. This is in the form of a very thin layer and is to all intents and purposes optically transparent. Lastly, a surface 12 is applied which forms the photoelectric area from which electrons may be ejected and whose velocities will be dependent upon the particular color of the incident light. Such a surface may be formed of a barium oxide or cadmium sulfide. While I have described the conductive layer and the photoelectric layer as being two independent layers, a single layer of a particular substance which is both conductive and photoelectric may be used. Thus the color picture is focused by the lens system on the eventual photoelectric surface 12.

A first accelerating grid 14 is mounted an optimum distance from the photoelectric surface and is properly biased with respect to the photoelectric surface through the use of a source of voltage indicated at 16 as a battery. Thus, electrons will be pulled from the photoelectric surface and started along their course to the right-hand end of the tube. Photoelectrically ejected electrons would be accelerated axially through the tube.

The next section in the tube axially to the right in Fig. 1 is a scanning or spot selective system. It is desired to provide means whereby only a small area of the photoelectric surface is permitted to project electrons axially through the velocity selective means at one instant to selective color areas on which they may reproduce one color. The first grid tube encountered by the electron as it moves axially through the tube after the accelerating grid is grid 18 which is a trapping grid and removes the excess electrons that bounce back from the surface of the scanning section if not allowed to pass therethrough. This grid is kept at a modest positive potential by power sources within the system.

Figure 2:
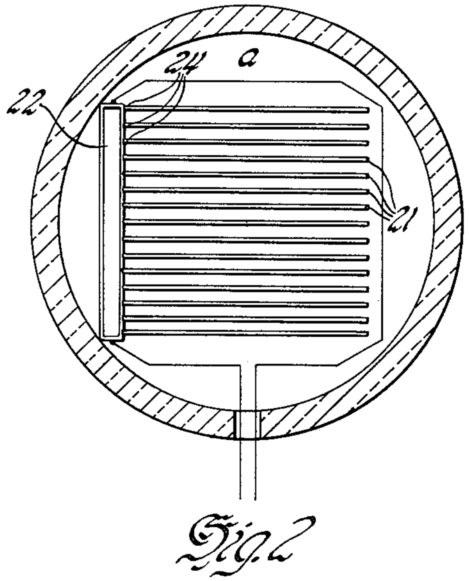
Figure 2 is a sectional view taken on line 2—2 of Figure 1 which shows a portion of the electronic scanning system.

The scanning system consists of two primary sections which are substantially square. Included in the first section are a plurality of closely spaced horizontal conductive lines 21 connected in sequence along a delay line 22 and in the second a similar set of closely spaced vertical conductive lines 23. These are best shown in Figs. 2 and 3. In general, both of these grids carry a negative charge and therefore the barrier formed thereby normally would tend to repel any electron which was proceeeding axially through the tube. In order to provide a small aperture or window through which selected electrons could pass and to cause that window to scan or move over the entire surface provided by these two grids, a positive square wave pulse is applied to two adjacent wires in the first grid 21 and caused to move sequentially down the grids 21 repetitively always energizing two wires. This is illustrated in Fig. 3*a*. This action is provided by utilizing a square waved fixed frequency generator 20 whose output is connected directly across a delay line 22. Thus a pulse generated by the square wave generator 20 is introduced to one end of the delay line 22 and then moved along said line to sequentially energize a pair of wires of the horizontal grid. This, therefore, provides a vertically moving or scanning slot through the first grid. This is illustrated in Figures 2 and 3 where the delay line 22 is shown together with a plurality of taps 24 of the horizontal grid. It is further illustrated by the diagonal hatching 26 shown on Figure 3*b*. The pulse 28 provided by the square wave generator 20 is illustrated in Figure 3*a* and it is to be noted that the duration of the pulse is greater than the physical distance between two adjacent lines and therefore as the pulse proceeds along the delay line, two adjacent horizontal lines will always be energized. This produces a horizontal slot that moves vertically over the area.

In a similar manner, a vertical slot movable transversely across the area is provided by simultaneously energizing two vertical lines 23 in the associated grid 30. This grid is connected through multiple lines 25 and 27 to points in the square wave frequency generator to step the energization of two adjacent lines horizontally across this grid each cycle of the vertical scanning. This is illustrated on Figure 3*b* by the cross hatching 32 and thus provides a vertical horizontally moving slot. While these two slots have been defined as apertures, neither one alone is of sufficient transparency to permit the passage of the electron beam which it is desired to control. This is accomplished by setting the amplitude of the square wave that is applied to the time delay line 22 and the amplitude of the voltage applied to the vertical wires 23 in the grid 30 to a point such that only partial transparency will be provided by each. However, where the two cross or overlap, the combined result will be such that the aperture, such as that shown at 34 in Figure 3*b*, will now act as a complete transparency and permit the electron beam to easily pass through. Thus, it will be evident that as the square wave pulse passes along the time delay line 22 to vertically scan the control grid area and simultaneously step the vertical transparent slot along at the end of each pass, the result will be to provide a small aperture bounded by two adjacent horizontal and vertical lines over the whole area of the grid in a single complete cycle. This scanning is of course accomplished very rapidly and of a sufficient short time to prevent any appreciation of movement by the observer. This section therefore permits a small scanning beam of electrons to pass axially beyond this position to the right. This small beam will be moving at a velocity dependent upon the predominant color of that area which is being scanned by the electronic scanner and it is the function of the next three sections of the tube to separate or classify the various velocities inherent in this particular group according to the primary colors.

Generally the blue colors have the highest velocity and it is intended that the signal attributable to the amount of blue being transmitted be collected on the grid 36 which is that most remote from the scanning area. These electrons, therefore, should be accelerated through the first velocity selecting section formed of the grids 38, 40 and 42 and still accelerated to a lesser degree or perhaps even slightly decelerated through the second velocity selecting grids 44, 46 and 48. Therefore by the time this blue electron reaches the third velocity selecting section formed of the grids 50, 36 and 52, it should be moving at such a velocity that it can be stopped or collected on grid 36. There may be electrons in the beam passing through the scanning means which have a velocity greater than the blue and these would pass on normally to a more remote position. The grids 54 and 56 in the right-hand end of the tube are provided to collect these and remove them to prevent causing any spurious signals.

The slower moving yellow component electrons traveling through the velocity selector system will in turn be accelerated by the first set of grids 38, 40 and 42, and decelerated by grids 44, 46 and 48 such that the signal corresponding to the primary color of interest will be detected on grid 46. Similarly, the electrons which represent the primary color of interest in the red region will be decelerated by grids 38, 40 and 42 such that the signal corresponding to the primary color of interest in the red, will be detected on grid 40. This permits simultaneous detection of the three primary colors in perfect registry on separate grids so that they may be read or taken off and transmitted individually.

As illustrative of the above general description, reference is made to Figure 4 in which the various grids of the three velocity selective sections are indicated by the same reference characters and below these grids the resultant voltage of the grid group is illustrated to show its effect on the electron instantly at that point. Let it be assumed that an electron with a velocity corresponding to the blue primary color is leaving the scanning grid indicated diagrammatically at 30 at time $T_0$, then a voltage distribution curve developed by grids 38 and 42 is shown at 60 which it is seen is predominantly positive, which permits the electron to gain energy from the field. By the time this electron has reached the first section $V_3$ at time $T_0+\Delta T_1$, the potential distribution of grid groups $V_2$ and $V_3$ are shown in the second chart below labeled $T_0+\Delta T_1$. The voltage distribution is shown by the curve 62 for the first grid group $V_3$. It is still predominantly of such character that the electron will continue to be accelerated down the tube. Similarly, the blue electron when it reaches grid group $V_2$ will be permitted to pass with acceleration or even slight deceleration and continue to grid group $V_1$. The potential distributions for grid groups $V_2$ and $V_1$ at the time the electron passes grid 46 are shown in the third diagram below at 65 and 67. Finally, the electron in the blue region of the spectrum reaches grid group $V_1$ and is decelerated by both grids 50 and 52 and collected on grid 36 from which it may be detected. A potential distribution for grid group $V_1$ to produce this result is shown as curve 64 in the bottom diagram of Figure 4.

In like manner and without specifically drawing curves therefor, electrons belonging to the primary color group yellow are accelerated by the first section $V_3$ but are collected and detected by the second group $V_2$ on grid 46. Lastly, those electrons predominantly of the red group do not proceed any farther than the first group of grids and are decelerated and collected on grid 40 of group $V_3$.

The radio frequency signals which provide these first control voltages on the grids 38, 42, 44, 48, 50 and 52 are provided by the radio frequency generator 66 in which the control waves are generated and phased as determined by the geometry of the tube and primary colors which it is desired to select. Since the radio frequency generator 66 does apply these control voltages at the precise times needed, it is connected through a synchronizer 68 with each of the collector grids 40, 46 and 36 in order to apply the signals appearing on each of these collector grids in the proper phased sequency to the amplifier 70 from which the signals are instantaneously applied to any desired output through individual lines B, G and R.

In Figure 1, the electronic scanning means consists of a pair of linear multiple grids at right angles to each other which produced a traveling window which scanned the area. Figure 5 shows a modified form of scanning means for accomplishing the same result. As in the previous instance the first grid 72 of this section of the modified form of tube 2' also carries a slightly positive charge in order to absorb and remove the electrons which are repelled by the scanning system. The second grid 74 is made of a small wire mesh which is coated with a thin layer of glass and which, when a negative voltage is applied thereto, forms a dipole field on the exterior of the glass and repels the negative electrons which are proceeding from the electrophotosensitive surface.

To provide a scanning window, a spot in the grid area is made transparent to the electron beam by directing a ray of electrons to the surface of grid 74 from a scanning gun which traverses the surface. At the point of incidence of the ray the electrons dislodge the electrons on the surface and create a momentary positive window which lets the axially traveling color characteristic electrons through.

Any suitable scanning means can be utilized to project a scanning beam up through the tunnel 76 as shown in Figure 5. In the process of passing through the small transparent area in the grid 74 the electrons dislodge other negative electrons from the area around the aperture and a collecting electrode 78 bearing a positive charge is provided to drain off these slow-moving electrons from this area. Desired electrons of the proper velocities determined by the desired colors then continue and travel down the tube and are selected according to the system described with respect to Figure 1.

I claim:

1. In television pickup means, a casing, a photoelectric area mounted in said casing upon which a polychrome picture to be transmitted appears, a first accelerating means mounted adjacent said photoelectric area to assist in the flow of electrons from the area, said electrons moving at different speeds depending upon the portion of the color spectrum which they represent, a plurality of axially spaced collecting grids mounted in the path of electron flow, accelerating and decelerating means associated with each collecting grid and synchronized phased voltage supply means connected to each of the accelerating and decelerating means to selectively control the flow of electrons so that those having different speeds will be collected on different grids.

2. In television pickup means, a casing, a photoelectric area mounted in said casing upon which a polychrome picture to be transmitted appears, a first accelerating means mounted adjacent said photoelectric area to assist in the flow of electrons from the area, said electrons moving at different speeds depending upon the portion of the color spectrum which they represent, a plurality of axially spaced collecting grids mounted in the path of electron flow, accelerating and decelerating means associated with each collecting grid, synchronized phased voltage supply means connected to each of the accelerating and decelerating means to selectively control the flow of electrons so that those having different speeds will be collected on different grids, electron opaque means mounted between the first accelerating means and the spaced collector grids to prevent electron flow therethrough, means connected to said opaque means to cause a small window to be momentarily transparent to permit a beam of electrons to pass through and means to cause said window to repetitively and rapidly scan the whole surface of the opaque means.

3. In television pickup means, a casing, a photoelectric area mounted in said casing upon which a polychrome picture to be transmitted appears, a first accelerating means mounted adjacent said photoelectric area to assist in the flow of electrons from the area, said electrons moving at different speeds depending upon the portion of the color spectrum which they represent, a plurality of axially spaced collecting grids mounted in the path of electron flow, accelerating and decelerating means associated with each collecting grid, synchronized phased voltage supply means connected to each of the accelerating and decelerating means to selectively control the flow of electrons so that those having different speeds will be collected on different grids, opaque grid means mounted between the first accelerating means and the spaced collector grids preventing electron flow therethrough, said opaque grid including one set of horizontal conductors, means for applying a positive voltage sequentially to adjacent conductors to scan the group, a second set of vertical conductors and means to apply a positive voltage in sequence to the conductors of this second set which steps progress as controlled by the first.

4. In television pickup means, a member having a photoelectric surface upon which a polychromatic picture is focused and from which electrons are expelled at speeds that differ depending upon the portion of the color spectrum which they represent, opaque means mounted in the path of the electrons, means to cause a portion of the opaque means to become transparent and to scan over the surface to permit a small beam of electrons through, a plurality of spaced aligned collector grids mounted in the path of the electrons, accelerating and decelerating means mounted adjacent each of the collector grids and synchronized phased voltage supply means connected to the accelerating and decelerating means to provide for collection of electrons on each collecting grid depending upon the speed of travel of said electrons to produce simultaneous charges on each collector grid representative of a monochromatic picture.

5. In television pickup means, a member having a photoelectric surface upon which a polychromatic picture is focused and from which electrons are expelled at speeds that differ depending upon the portion of the color spectrum which they represent, opaque means mounted in the path of the electrons, means to cause a portion of the opaque means to become transparent and to scan over the surface to permit a small beam of electrons through, a plurality of spaced aligned collector grids mounted in the path of the electrons, accelerating and decelerating means mounted adjacent each of the collector grids, synchronized phased voltage supply means connected to the accelerating and decelerating means to provide for collection of electrons on each collecting grid depending upon the speed of travel of said electrons to produce simultaneous charges on each collector grid representative of a monochromatic picture, amplifying means connected to the collector grids and output circuit means upon which synchronized signals proportional to the various colors of the original picture are developed.

6. In television pickup means, a tubular casing at least one end of which is transparent to light waves, a photoelectric member mounted in the casing adjacent the one end upon which a polychromatic picture may be focused and from which surface electrons are emitted axially through the tubular casing at speeds which are dependent upon the color represented, a screen member mounted across the casing, means for applying a potential to the screen to block the flow of electrons emitted by the photoelectric surface, means for changing the potential on discreet portions of the screen to permit the electrons to pass through and for continuously changing the location of the discreet portions to cause a scanning action and permit passage of electrons from all parts of the photoelectric member during one cycle, and charged grids spaced on both sides of the screen to drain off surplus electrons.

7. In television pickup means, a tubular casing at least one end of which is transparent to light waves, a photoelectric member mounted in the casing adjacent the one end upon which a polychromatic picture may be focused and from which surface electrons are emitted axially through the tubular casing at speeds which are dependent upon the color represented, a screen member mounted across the casing, means for applying a potential to the screen to block the flow of electrons emitted by the photoelectric surface, means for changing the potential on discreet portions of the screen to permit the electrons to pass through and for continuously changing the location of the discreet portions to cause a scanning action and permit passage of electrons from all parts of the photoelectric member during one cycle, spaced collecting grids mounted in said casing upon which it is desired to collect electrons of each color and accelerating and decelerating control grids mounted adjacent each of the collecting grids to control the electrons to be collected on the proper collector grid.

8. In television pickup means, a tubular casing at least one end of which is transparent to light waves, a photoelectric member mounted in the casing adjacent the one end upon which a polychromatic picture may be focused and from which surface electrons are emitted axially through the tubular casing at speeds which are dependent upon the color represented, a screen member mounted across the casing, means for applying a potential to the screen to block the flow of electrons emitted by the photoelectric surface, means for changing the potential on discreet portions of the screen to permit the electrons to pass through and for continuously changing the location of the discreet portions to cause a scanning action and permit passage of electrons from all parts of the photoelectric member during one cycle, spaced collecting grids mounted in said casing upon which it is desired to collect electrons representative of each color, accelerating and decelerating control grids mounted adjacent each of the collecting grids to control the electrons to collect on the proper collector grid and synchronized phased power supply means connected to the accelerating and decelerating grids to velocity select the electrons for each collector grid.

9. In television pickup means, a tubular casing at least one end of which is transparent to light waves, a photoelectric member mounted in the casing adjacent the one end upon which a polychromatic picture may be focused and from which surface electrons are emitted axially through the tubular casing at speeds which are dependent upon the color represented, a screen assembly mounted across the casing to block the flow of electrons, said screen including a plurality of horizontal spaced conductors and a plurality of vertical spaced conductors, means for applying a negative bias to the conductors so that the screen will block flow of electrons therethrough, square wave generating means, and a delay line connected to the square wave generating means and to the horizontal conductors to sequentially apply positive voltage to the conductors and means for sequentially applying positive voltage to the vertical conductors in timed relation to the square waves to provide a scanning window in the screen.

10. In television pick-up means, an elongated casing, a photoelectric area mounted in one end of the casing from the inner surface of which electrons are emitted and move axially along the casing at different speeds dependent upon that portion of the color spectrum which they represent and a plurality of collecting grid assembly means supplied with synchronized phased voltages mounted in spaced relation along the axis of the tube in the path of electrons, said phased voltages supplied to each grid assembly means, being so phased as to cause selective accumulation of electrons traveling at different speeds on different grid assemblies so that all of the electrons representative of a given color will accumulate on a given grid to be read off.

11. In television pick-up means, an elongated casing, a photoelectric area mounted in one end of the casing upon which a polychrome picture to be transmitted appears, a first accelerating means mounted adjacent said photoelectric area to assist in the flow of electrons from said area along the casing, said electrons moving at different speeds dependent upon that portion of the color spectrum which they represent, scanning means mounted in spaced axial relation to the first accelerating means and receiving electrons from the photoelectric area to cause said electron radiation to scan over transverse planes in the casing beyond the scanning means, a plurality of axially spaced collecting grids mounted in the path of electron flow beyond the scanning means, accelerating and decelerating means associated with each collecting grid and synchronized phased voltage supply means connected to each of the accelerating and decelerating means to selectively control the flow of electrons so that those having different speeds may be collected on different grids for selective read-off.

References Cited in the file of this patent

UNITED STATES PATENTS

| | | |
|---|---|---|
| 1,779,748 | Nicolson | Oct. 28, 1930 |
| 2,596,061 | Webley | May 6, 1952 |
| 2,807,741 | Fulmer | Sept. 24, 1957 |
| 2,821,653 | Dyer | Jan. 28, 1958 |